(12) United States Patent
Riedell (10) Patent No.: US 10,967,621 B2
(45) Date of Patent: Apr. 6, 2021

(54) METHODS FOR FORMING CERAMIC MATRIX COMPOSITE STRUCTURES

(71) Applicant: COI CERAMICS, INC., San Diego, CA (US)

(72) Inventor: James A. Riedell, San Diego, CA (US)

(73) Assignee: COI Ceramics, Inc., San Diego, CA (US)

( * ) Notice: Subject to any disclaimer, the term of this patent is extended or adjusted under 35 U.S.C. 154(b) by 342 days.

(21) Appl. No.: 14/644,062

(22) Filed: Mar. 10, 2015

(65) Prior Publication Data

US 2015/0306855 A1 Oct. 29, 2015

Related U.S. Application Data

(63) Continuation of application No. 11/925,492, filed on Oct. 26, 2007, now Pat. No. 8,974,891.

(51) Int. Cl.
*B32B 37/00* (2006.01)
*B32B 37/18* (2006.01)
(Continued)

(52) U.S. Cl.
CPC ............ *B32B 37/0084* (2013.01); *B32B 3/10* (2013.01); *B32B 18/00* (2013.01); *B32B 37/18* (2013.01);
(Continued)

(58) Field of Classification Search
CPC ........ F01D 5/20; F01D 11/001; F01D 11/003; F01D 11/006; F01D 11/008; F01D 11/02;
(Continued)

(56) References Cited

U.S. PATENT DOCUMENTS

| | | | |
|---|---|---|---|
| 4,308,309 A | 12/1981 | Frosch et al. | |
| 4,344,591 A | 8/1982 | Jackson | |

(Continued)

FOREIGN PATENT DOCUMENTS

| | | |
|---|---|---|
| EP | 1 544 565 A2 | 6/2005 |
| JP | 01196191 A | 8/1989 |

(Continued)

OTHER PUBLICATIONS

European Search Report and Search Opinion of the European Patent Office, European Application No. 08015938.7, dated Feb. 6, 2012, eight (8) pages.

(Continued)

*Primary Examiner* — Alex B Efta
(74) *Attorney, Agent, or Firm* — TraskBritt (57) ABSTRACT

Methods of forming ceramic matrix composite structures include joining at least two lamina together to form a flexible ceramic matrix composite structure. Ceramic matrix composite structures include at least one region of reduced inter-laminar bonding at a selected location between lamina thereof. Thermal protection systems include at least one seal comprising a ceramic matrix composite material and have at least one region of reduced inter-laminar bonding at a selected location between lamina used to form the seal. Methods of forming thermal protection systems include providing one or more such seals between adjacent panels of a thermal protection system.

19 Claims, 6 Drawing Sheets

(51) Int. Cl.
  *B32B 38/18* (2006.01)
  *B32B 18/00* (2006.01)
  *B32B 3/20* (2006.01)
  *B32B 3/10* (2006.01)
  *C04B 35/64* (2006.01)
  *C04B 35/634* (2006.01)
  *C04B 35/645* (2006.01)
  *C04B 37/00* (2006.01)
  *F16J 15/00* (2006.01)
  *F16J 15/10* (2006.01)

(52) U.S. Cl.
  CPC .......... *B32B 38/1808* (2013.01); *C04B 35/64* (2013.01); *C04B 37/005* (2013.01); *C04B 37/006* (2013.01); *C04B 37/008* (2013.01); *F16J 15/104* (2013.01); *B32B 3/20* (2013.01); *B32B 2307/546* (2013.01); *B32B 2315/02* (2013.01); *C04B 35/634* (2013.01); *C04B 35/645* (2013.01); *C04B 2235/6028* (2013.01); *C04B 2235/6581* (2013.01); *C04B 2235/6583* (2013.01); *C04B 2235/6585* (2013.01); *C04B 2235/664* (2013.01); *C04B 2235/668* (2013.01); *C04B 2237/062* (2013.01); *C04B 2237/064* (2013.01); *C04B 2237/08* (2013.01); *C04B 2237/086* (2013.01); *C04B 2237/10* (2013.01); *C04B 2237/122* (2013.01); *C04B 2237/127* (2013.01); *C04B 2237/30* (2013.01); *C04B 2237/32* (2013.01); *C04B 2237/341* (2013.01); *C04B 2237/343* (2013.01); *C04B 2237/36* (2013.01); *C04B 2237/363* (2013.01); *C04B 2237/365* (2013.01); *C04B 2237/368* (2013.01); *C04B 2237/38* (2013.01); *C04B 2237/525* (2013.01); *C04B 2237/592* (2013.01); *C04B 2237/62* (2013.01); *C04B 2237/76* (2013.01); *Y10T 428/169* (2015.01); *Y10T 428/17* (2015.01); *Y10T 428/24562* (2015.01); *Y10T 428/24612* (2015.01); *Y10T 428/24752* (2015.01); *Y10T 428/24926* (2015.01)

(58) Field of Classification Search
  CPC .... F01D 11/12; F16J 15/3288; F16J 15/3292; C04B 2237/58; C04B 2237/592; B32B 37/26; B32B 37/0076; B32B 2037/0092; B32B 2037/262; B32B 37/30; B32B 3/02; B32B 3/08; B32B 5/142; B32B 7/02; B32B 7/045
  See application file for complete search history.

(56) References Cited

U.S. PATENT DOCUMENTS

| | | | |
|---|---|---|---|
| 4,678,113 A * | 7/1987 | Bridges | A46D 1/08 228/160 |
| 4,992,318 A * | 2/1991 | Gadkaree | B32B 5/26 428/113 |
| 5,133,994 A * | 7/1992 | Barbaza | C04B 35/80 427/248.1 |
| 5,177,039 A | 1/1993 | Allaire et al. | |
| 5,225,015 A | 7/1993 | Allaire et al. | |
| 5,376,598 A | 12/1994 | Preedy et al. | |
| 5,400,489 A | 3/1995 | Hegner et al. | |
| 5,560,569 A | 10/1996 | Schmidt | |
| 6,048,170 A | 4/2000 | Dodd | |
| 6,156,130 A | 12/2000 | Hegner et al. | |
| 6,199,871 B1 * | 3/2001 | Lampes | F01D 11/005 277/614 |
| 6,497,776 B1 | 12/2002 | Butler et al. | |
| 6,502,825 B2 | 1/2003 | Aksit et al. | |
| 6,627,019 B2 | 9/2003 | Jarmon et al. | |
| 6,772,482 B2 * | 8/2004 | Crudgington | F16J 15/3288 16/355 |
| 6,827,312 B2 | 12/2004 | Riedell | |
| 6,883,807 B2 | 4/2005 | Smed | |
| 7,181,843 B1 * | 2/2007 | Tabbita | A46B 3/06 156/72 |
| 7,334,800 B2 * | 2/2008 | Minnich | F01D 11/005 277/644 |
| 7,458,587 B2 | 12/2008 | Caplain et al. | |
| 7,494,557 B1 * | 2/2009 | Peterson | B32B 18/00 156/89.11 |
| 7,901,775 B2 | 3/2011 | Miyamoto | |
| 2002/0075624 A1 | 6/2002 | Wang et al. | |
| 2003/0111797 A1 | 6/2003 | Chung et al. | |
| 2003/0138613 A1 | 7/2003 | Thoman et al. | |
| 2004/0175553 A1 | 9/2004 | Bouillon et al. | |
| 2005/0263238 A1 | 12/2005 | Takase et al. | |
| 2006/0025514 A1 | 2/2006 | Miyamoto | |
| 2006/0061046 A1 | 3/2006 | Caplain et al. | |
| 2007/0108670 A1 | 5/2007 | Merrill et al. | |
| 2007/0138706 A1 * | 6/2007 | Metzger | B01J 6/008 264/432 |
| 2007/0214865 A1 | 9/2007 | Nakae et al. | |
| 2008/0199307 A1 * | 8/2008 | Keller | F01D 5/22 415/135 |
| 2012/0171430 A1 | 7/2012 | Riedell | |

FOREIGN PATENT DOCUMENTS

| | | |
|---|---|---|
| JP | 02080380 A | 3/1990 |
| JP | H2-80380 A | 3/1990 |
| JP | 04041256 A | 2/1992 |
| JP | 06009277 A | 1/1994 |
| JP | H06-033963 A | 2/1994 |
| JP | 07035815 U | 7/1995 |
| JP | 2001-289274 A | 10/2001 |
| JP | 2002234777 A | 8/2002 |
| JP | 2004323306 A | 11/2004 |
| JP | 2006062943 A | 3/2006 |
| JP | 2006-515049 A | 5/2006 |

OTHER PUBLICATIONS

Zok et al., Mechanical Properties of Porous-Matrix Ceramic Composites, Advanced Engineering Material, 2001, 3, No. 1-2, pp. 15-23.
European Examination Report, for European Application No. 08 015 938.7, (dated Dec. 5, 2017), 9 pages.
European Examination Report for European Application No. 08 015 938.7, (dated May 27, 2013), 8 pages.
European Examination Report for European Application No. 08 015 938.7, (dated Apr. 21, 2016), 8 pages.
Japanese Notification of Reasons for Refusal and Search Report for Japanese Application No. 2008-269819, (Notice dated Feb. 17, 2012) (Search dated Jan. 13, 2012), 71 pages including translation.
Japanese Notification of Reasons for Refusal for Japanese Application No. 2008-269819, (dated Jan. 24, 2013), 9 pages including translation.
Japanese Notification of Reasons for Refusal for Japanese Application No. 2008-269819, (dated Oct. 21, 2013), 8 pages including translation.
Japanese Notification of Reasons for Refusal for Japanese Application No. 2008-269819, (dated Oct. 22, 2014), 4 pages including translation.
European Communication pursuant to Article 94(3) EPC for European Application No. 19170039.2, dated Jul. 28, 2020, 8 pages.

* cited by examiner

METHODS FOR FORMING CERAMIC MATRIX COMPOSITE STRUCTURES

CROSS-REFERENCE TO RELATED APPLICATION

This application is a continuation of U.S. patent application Ser. No. 11/925,492, filed Oct. 26, 2007, now U.S. Pat. No. 8,974,891, issued Mar. 10, 2015, the disclosure of which is hereby incorporated in its entirety herein by this reference.

STATEMENT REGARDING FEDERALLY SPONSORED RESEARCH

The United States Government may have certain rights in the present invention pursuant to Contract No. F33615-00-C-3004 between the Department of the Air Force and COI Ceramics, Inc., an affiliate of Alliant Techsystems Inc., now Northrop Grumman Innovation Systems, Inc.

FIELD OF THE INVENTION

The present invention relates generally to ceramic matrix composites and, more specifically, to ceramic matrix composite structures adapted for use in high temperature environments requiring relatively high flexibility, compliance, and/or large displacement.

BACKGROUND

Ceramic matrix composites (CMC) are materials comprised of a continuous reinforcing phase (ceramic or carbon fibers) embedded in a ceramic phase (matrix). CMC materials exhibit physical properties and characteristics that are desirable for many military and industrial technical applications. Such physical properties and characteristics include, for example, high-temperature stability, high thermal-shock resistance, high hardness, high corrosion resistance, light weight, nonmagnetic and nonconductive properties, and versatility in providing unique engineering solutions. CMC materials can be used, for example, in industrial electric equipment, aircraft, spacecraft, automobiles, electronic devices and equipment, precision machine equipment, and high temperature structural members.

As one particular non-limiting example, CMC materials have been used in thermal protection systems (TPS). Conventional TPS are often employed in aerospace systems, such as engine exhaust ducts, nose cones, re-entry shield surfaces, etc., which are exposed to high temperatures or large temperature gradients. TPS conventionally employ a multi-component "mosaic" structure comprising a plurality of insulative CMC panels or tiles that are attached to the surface of a structure or member that is intended to be protected by the TPS. One example of such a TPS is found on the outer surfaces of the re-useable space shuttles used by NASA. During manufacture of the space shuttle, the plurality of insulative panels are conventionally disposed in such a manner as to provide a predetermined amount of space between each panel to allow for thermal expansion of the tiles without interference between adjacent panels at high temperatures. These spaces between the panels are conventionally covered to improve aerodynamics and reduce drag. For example, U.S. Pat. No. 5,560,569 to Schmidt discloses a TPS employing a gap cover or gap cover webbing to cover the thermal expansion gaps between thermal panels. It would be desirable to provide a compliant and flexible sealing structure comprising a CMC material in the spaces between the panels. However, conventional CMC materials suffer from low flexibility.

Thus, many applications requiring high temperature resistance may benefit from a CMC structure of relatively high flexibility.

BRIEF SUMMARY OF THE INVENTION

In some embodiments, the present invention includes methods of forming structures exhibiting enhanced flexibility and comprising CMC materials. The methods include joining at least two lamina together so as to provide at least one bonded region and at least one region having at least reduced inter-laminar bonds to form a CMC structure. In some embodiments, the lamina may be joined by laying up the lamina with a bond-inhibiting material or structure positioned therebetween and sintering the lamina to form a CMC structure. In other embodiments, two or more cured, partially sintered, or sintered lamina may be joined using a bond material positioned between the lamina.

In additional embodiments, the present invention includes CMC structures exhibiting enhanced flexibility that comprise a plurality of lamina that are bonded to one another. At least one area or region between at least two lamina of the plurality of lamina may exhibit reduced inter-laminar bonding, or may be substantially free of inter-laminar bonding. In some embodiments, there may be a gap or space between the at least two lamina at such an area or region therebetween.

In further embodiments, the present invention includes thermal protection systems having a plurality of insulative panels positioned side by side. The thermal protection systems may further include at least one seal comprising a CMC structure at least partially disposed between two insulative panels of the thermal protection systems. The CMC structure may include a plurality of bonded lamina, and at least one area or region between at least two lamina of the plurality of lamina may exhibit reduced inter-laminar bonding, or may be substantially free of inter-laminar bonding, to promote flexibility.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

FIGS. 5A-5D illustrate CMC structures configured according to different exemplary embodiments of the present invention.

DETAILED DESCRIPTION

The illustrations presented in the drawing figures herein are, in some instances, not actual views of any particular CMC structure or of any particular application for a CMC structure. Rather, the illustrations are merely representations which are employed to describe the present invention. Additionally, elements common between figures may retain the same numerical designation.

In the following description, certain terminology is used to describe certain features of the embodiments of the invention. For instance, the term "interlaminar bonds" refers to bonding (e.g., covalent chemical bonding or ionic chemical bonding) of one lamina to another lamina disposed adjacent thereto. Further, the terms "tile" and "panel" may be used interchangeably to identify insulative components with which a CMC structure exhibiting enhanced flexure capability according to an embodiment of the invention may be employed.

Methods for forming a ceramic matrix composite structure 108 (FIG. 1C), 108' (FIG. 6B) exhibiting enhanced flexibility include joining a plurality of lamina 102 together. The lamina 102 are joined so there is at least one bonded region and at least one region having at least reduced inter-laminar bonds.

Figure 1A:
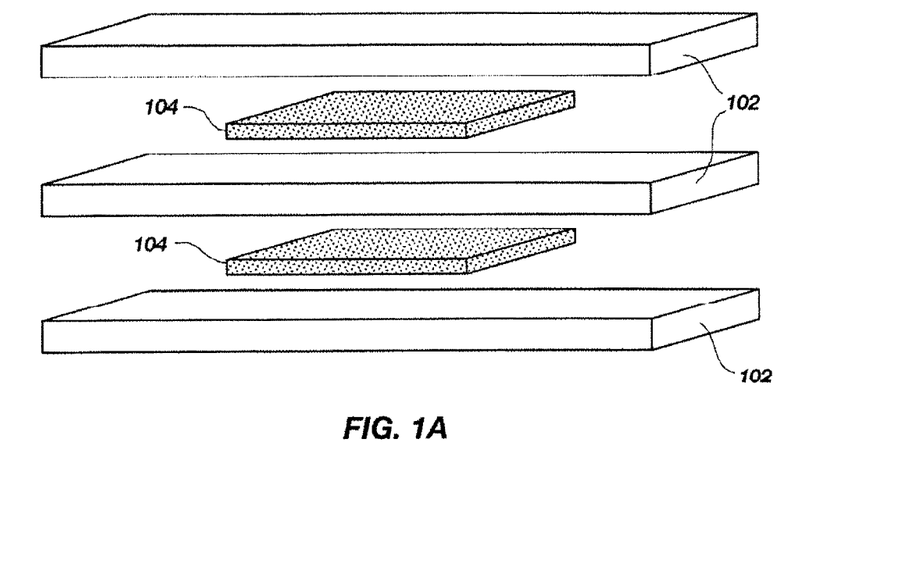
FIG. 1A is an exploded view illustrating components used in the construction of a structure comprising a CMC material according to one embodiment of the invention.
Figure 1B:
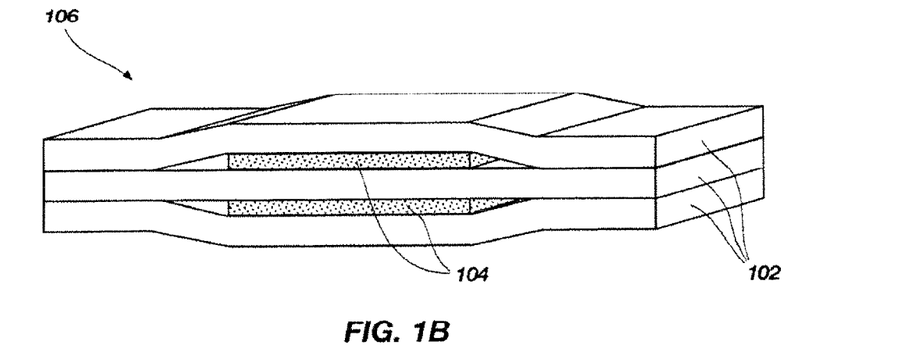
FIG. 1B illustrates the components shown in FIG. 1A in an assembled configuration.
Figure 1C:
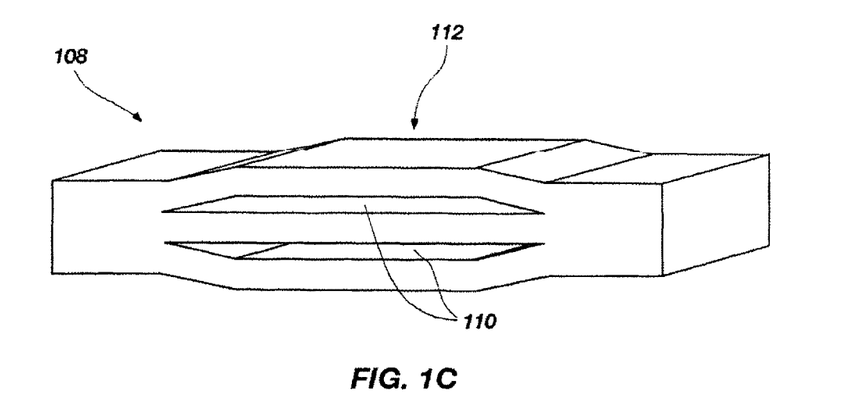
FIG. 1C illustrates a CMC structure fabricated according to the embodiment of FIGS. 1A and 1B.

Referring to FIGS. 1A-1C, the construction of an embodiment of a CMC structure 108 (FIG. 1C) employing a bond-inhibiting structure 104 is illustrated as one non-limiting example. As discussed in further detail below, the CMC structure 108 may comprise one or more suitable CMC materials such as, but not limited to, oxide-based CMC materials and non-oxide-based CMC materials.

Referring to FIG. 1A, a plurality of sheets or lamina 102 are superimposed with segments of bond-inhibiting material 104 disposed therebetween. The lamina 102 may be in a cured state in some embodiments or an uncured state in other embodiments when they are superimposed. Each lamina 102 may comprise reinforcing fibers (not shown). In some embodiments, one or more of the lamina 102 may comprise a woven fabric or unidirectional tape of reinforcing fibers. In additional embodiments, one or more of the lamina 102 may comprise a mat of randomly distributed fibers, or discontinuous chopped fibers. The fibers may comprise, by way of a non-limiting example, carbon fibers, polyimide fibers, Silicon carbide (SiC) fibers, Siliconoxycarbide (SiOC) fibers, alumina, mullite or sapphire-based fibers, or any other ceramic or polymeric fibers that are capable of withstanding the temperatures and other conditions experienced during fabrication of the CMC structure 108 (FIG. 1C) without undergoing significant degradation. Each lamina 102 may further comprise a matrix precursor material (not shown) suitable for subsequently forming a ceramic matrix around and between the fibers. For example, the matrix precursor material may comprise a slurry that includes ceramic particles or ceramic precursor particles suspended in a fluid medium. In other embodiments, the matrix precursor material may comprise a polymer material that may be subsequently processed (e.g., caused to combust or caused to undergo another chemical transformation) to form a ceramic matrix material, or a polymer precursor material (for subsequent polymerization and processing to form a ceramic matrix material). The matrix phase may also be deposited about the fibers using a chemical vapor deposition (CVD) or infiltration (CVI) method. Any of the matrix-forming methods used by those experienced in the art of CMC manufacturing would be suitable for creating the locally non-bonded areas in the laminated structure.

Methods that may be used to form such lamina 102 are known to those of ordinary skill in the art. As a non-limiting example, the lamina 102 may be formed by impregnating fabric of reinforcing fibers (not shown) with a ceramic matrix slurry or a pre-ceramic polymer (not shown) to form so-called "prepregged" lamina. The fabric may comprise any suitable fibers for reinforcing a ceramic matrix. Examples of commercially available reinforcing fiber materials for oxide CMC materials include NEXTEL® 312, NEXTEL® 440, NEXTEL® 550, NEXTEL® 610, and NEXTEL® 720, which are each available from 3M of St. Paul, Minn. Examples of commercially available reinforcing fiber materials for non-oxide CMC materials include SYL-RAMIC™, available from COI Ceramics, Inc. of San Diego, Calif., USA and CG NICALON™, HI-NICALON™ and NICALON Type S™, which are each available from Nippon Carbon Co., Ltd. of Tokyo, Japan. Carbon fibers are also non-oxide fibers and may be used in forming non-oxide CMC materials. The ceramic matrix slurry which is impregnated into the reinforcing fibers of the lamina 102 may comprise any suitable ceramic or ceramic precursor particles in addition to a binding phase. By way of example and not limitation, an oxide matrix may be comprised of alumina, silica, mullite, or other refractory ceramic particles dispersed in an amorphous or crystalline alumina or aluminosilicate binding phase, where the binding phase may be derived from a sol-gel precursor. A non-oxide matrix may be derived, for example, from silicon carbide, silicon nitride, or numerous other refractory ceramic particles dispersed in an amorphous or crystalline silicon carbide, silicon nitride, silicon carbonitride, silicon oxycarbide or other refractory ceramic binding phase, where the binding phase may be derived from a preceramic polymer. Preceramic polymers include compositions that yield a ceramic phase upon oxidation or pyrolysis, and include for example polycarbosilane, polysiloxane, polysilazane, and various other organometallic polymers.

Referring to FIG. 1B, the plurality of superimposed lamina 102 with interposed segments of bond-inhibiting material 104 form a multi-laminar structure 106, which may be further processed to form the desired final CMC structure 108 (FIG. 1C), as discussed in further detail below. This process of positioning the lamina 102 adjacent to one another is often referred to in the art as "laying-up" the multi-laminar structure 106. If it is desired to cause the multi-laminar structure 106 to have a particular shape, the multi-laminar structure 106 may be laid-up on or in a tool, such as on a mandrel, on a die or in a mold (not shown) having a shape complementary to that of the desired shape for the multi-laminar structure 106, such techniques being well known to those of ordinary skill in the art.

As also shown in FIGS. 1A and 1B, one or more segments of bond-inhibiting material, also referred to for convenience as a "bond-inhibiting structure" 104, may be provided between the adjacent lamina 102 at selected locations or regions as the lamina 102 are positioned adjacent to one another in laying-up the multi-laminar structure 106. As discussed in further detail below, the bond-inhibiting structure 104 may be configured and positioned to selectively reduce or prevent inter-laminar bonding between adjacent lamina 102 as the multi-laminar structure 106 is subsequently processed to join the lamina 102 together in the form of the final CMC structure 108 shown in FIG. 1C. In other words, the bond-inhibiting structure 104 may be disposed at selected locations where it is desirable to reduce or prevent inter-laminar bonding between adjacent lamina 102. As discussed in further detail below, such locations may comprise regions of the CMC structure 108 at which it would be desirable for the CMC structure to exhibit relatively more flexibility. As used herein, the term "flexibility" refers to the ability of the structure to bend, twist or otherwise selectively deform without experiencing any significant damage to the structure. The term "relative flexibility" refers to the flexibility of the CMC structure of the present invention as compared to conventional CMC structures, which are generally relatively rigid.

As used herein, the term "bond-inhibiting structure" means any structure that is capable of reducing or preventing inter-laminar bonding between adjacent members during a process in which the adjacent members are bonded together to form a CMC structure. Bond-inhibiting structures include, but are not limited to, layers, regions, and films of bond-inhibiting material, as well as objects or other structures that may be positioned between the adjacent members to reduce or prevent inter-laminar bonding, or objects or other structures that may be positioned between the adjacent members as they are positioned adjacent to one another so as to form a gap or void therebetween, the gap or void reducing or preventing the inter-laminar bonding. The bond-inhibiting structure 104 may be relatively flat and planar as shown in FIGS. 1A and 1B, or the bond-inhibiting structure 104 may comprise a particular shape in order to provide a desired configuration and/or effect. Some non-limiting examples of particular shapes may include tubular, cylindrical, box-shaped, etc. Additionally, the bond-inhibiting structure 104 may include a substantially planar and smooth surface or it may comprise ribs, valleys, bumps, depressions or other out-of-plane features.

By way of example and not limitation, the bond-inhibiting structure 104 may comprise an organic material, a polymer material, a release agent, a metal insert, a material that may be deposited as a uniform layer and selectively etched away at selected locations, etc. Furthermore, the bond-inhibiting structure 104 may be configured to be chemically compatible with the CMC material of the CMC structure 108. For example, in some embodiments, the bond-inhibiting structure 104 may comprise a material selected or tailored so as not to degrade the fibers or ceramic matrix material of the CMC structure 108. Examples of materials that may degrade some fibers and/or ceramic matrix materials of a CMC structure 108 include iron, phosphate, fluorides, and/or calcium. Therefore, the bond-inhibiting structure 104 may be substantially free of such materials, or any other elements or materials that may negatively affect the particular materials comprising the fibers and the ceramic matrix material of the CMC structure 108 being formed.

In some embodiments of the invention, the bond-inhibiting material may comprise an organic material and/or a polymer material that will oxidize or otherwise decompose with negligible yield (referred to as a fugitive material), or evolve into a low-yield phase with negligible structural contributions to the CMC during sintering of the multi-laminar structure 106 (FIG. 1B) to form the CMC structure 108 (FIG. 1C). Such an organic and/or polymer material may be disposed between the lamina 102 as a thin film. By way of example and not limitation, the material may comprise an organic polymer material. Such materials may be provided in the form of a tape. A non-limiting example of such an organic tape is sold under the tradename FLASH-BREAKER® 1 by Airtech Advanced Materials Group of Huntington Beach, Calif.

In other embodiments of the present invention, the bond-inhibiting structure 104 may comprise a release agent that inhibits inter-laminar bonding between the lamina 102. Such release agents may or may not combust during a sintering process. By way of example and not limitation, a release agent may comprise polytetrafluoroethylene (PTFE) or a PTFE-based material. As described above, the release agent material should be chosen so as to not damage the CMC material.

In still other embodiments of the present invention, the bond-inhibiting structure 104 may comprise one or more structures that are used during lay-up, but are removed prior to sintering or pyrolysis of the CMC. As one non-limiting example, metal inserts comprising thin pieces or layers of metal may be employed as bond-inhibiting structures 104. In some embodiments, the metal insert may be coated with a release agent to facilitate removal of the metal insert from the multi-laminar structure 106 after forming the same. In embodiments comprising non-oxide-based CMC materials that are densified using a number of infiltration and pyrolysis cycles or chemical vapor infiltration, as described in more detail below, the metal insert may be coated with a release agent, inserted prior to infiltration and removed after infiltration, but prior to pyrolysis, during each of the plurality of cycles.

As one non-limiting example set forth merely as an example, when laying-up the multi-laminar structure 106, as shown in FIG. 1B, bond-inhibiting structure 104 may be applied to selected areas or regions of a surface of the first lamina 102, and a second lamina 102 then may be placed over the bond-inhibiting structure 104 and the first lamina 102 such that the bond-inhibiting structure 104 is disposed at selected locations between the first and second lamina 102 at which it is desired to reduce or prevent inter-laminar bonding and increase the relative flexibility of the resulting CMC structure 108 (FIG. 1C). Additional layers of bond-inhibiting structure 104 and lamina 102 then may be added in a similar, alternating manner to form the multi-laminar structure 106.

The positioning of the bond-inhibiting structure 104 for each layer may be specifically tailored to provide a desired result. In addition, the lamina 102 may be formed and positioned in such a way as to orient the fibers relative to each other, such as is known in the art. By specifically orienting the fibers of the plurality of lamina 102 and/or specifically positioning the bond-inhibiting structure 104, the multi-laminar structure 106 may be formed to exhibit specific properties or specific stiffness suitable for particular applications.

The multi-laminar structure 106 shown in FIG. 1B may be processed to form the desired CMC structure 108 shown in FIG. 1C using processes that are specific to the particular type of matrix precursor material used to impregnate the fibers in the lamina 102. Such processes may include a sintering process. Optionally, a curing process also may be performed prior to such a sintering process. As used herein, sintering refers to the different processes employed for the densification of both oxide and non-oxide matrix materials, as described in more detail below.

In some embodiments, the multi-laminar structure 106 may be cured to a green state. Such processes may be referred to in the art as "autoclaving" processes, and may include applying one or both of elevated temperatures and elevated pressures to the multi-laminar structure 106. A green structure formed by autoclaving the multi-laminar structure 106 shown in FIG. 1B optionally may be machined or otherwise shaped prior to sintering the green structure to a desired final density to form the CMC structure 108.

In additional embodiments, the multi-laminar structure 106 may be sintered to a desired final density to form the CMC structure 108 without any prior autoclaving process. Such processes also may optionally include additional forming of the laid-up multi-laminar structure 106 prior to sintering the multi-laminar structure 106 to a desired final density.

A conventional sintering process may be used to form the CMC structure 108 (FIG. 1C) from the multi-laminar structure 106 (FIG. 1B). The particular sintering time, temperature, pressure, and atmosphere used to sinter any particular multi-laminar structure 106 will depend upon the composition of the reinforcing fibers and/or ceramic matrix of the CMC structure 108 being formed. By way of example and not limitation, the sintering processes may include temperatures greater than about 1,800° Fahrenheit. Sintering processes may be conducted under vacuum, at atmospheric pressure, or at elevated pressures. Furthermore, pressure may be applied isotropically or anisotropically to the multi-laminar structure 106 during sintering. In some embodiments, at least a portion of the sintering process may be conducted in oxygen, air, or another oxidizing atmosphere. In additional embodiments, at least a portion of the sintering process may be conducted in a reducing, or inert atmosphere. As discussed in further detail below, the composition of the atmosphere may be selectively tailored to facilitate oxidation or other degradation of the bond-inhibiting structure 104 during sintering. The bond-inhibiting structure 104 inhibits bonding between the lamina 102 while the portions or regions where there is no bond-inhibiting structure 104 are joined together through interlaminar bonds.

During fabrication of embodiments of CMC structures of the present invention that are to comprise oxide matrix materials ("oxide-based CMC structures"), the multi-laminar structure 106 may be cured using relatively low pressures and temperatures. By way of example and not limitation, such multi-laminar structures may be cured at pressures of less than about 100 pounds per square inch and at temperatures less than about 350° Fahrenheit. After curing, a free standing pressureless sintering process above 2100° Fahrenheit may be used to sinter the resulting structure to a desired final density.

Embodiments of CMC structures of the present invention that are to comprise non-oxide matrix materials ("non-oxide-based CMC structures") may be fabricated using methods that differ from those used to form oxide-based CMC structures. By way of example and not limitation, a non-oxide-based CMC structure may be formed using a conventional re-infiltration or polymer impregnation and pyrolysis (PIP) process. In such a PIP process, a green or brown non-oxide-based CMC structure may be formed. The term brown state refers to a state in which the structure has a density that is less than the desired density of the final CMC structure 108. The structure may be pyrolyzed to convert the ceramic precursor material into a ceramic matrix phase. Pyrolysis includes sintering the structure in a controlled environment free from oxygen. After the first pyrolysis cycle, the structure may be re-infiltrated with additional preceramic polymer and pyrolyzed again. This PIP process may be repeated until the desired level of bulk density is obtained. By way of example and not limitation, the PIP process may be repeated until the open porosity comprises less than about 5% of the CMC structure by volume. This example of a PIP process is not intended to be limiting, and any suitable process may be employed. For example a chemical vapor infiltration (CVI) process may be employed to densify a non-oxide-based CMC structure.

In embodiments employing a bond-inhibiting structure 104 comprising an organic or polymer material, such material may be removed from between the lamina 102 during the sintering process described above. The composition of the material may cause it to oxidize when exposed to oxygen at the temperatures used to sinter a CMC structure of the present invention. When the organic bond-inhibiting structure 104 is burned away, the area where the material was disposed may exhibit reduced inter-laminar bonding, and, in some embodiments, may be substantially free of inter-laminar bonds as described in more detail below.

One method for forming a layer of bond-inhibiting structure 104 over a lamina 102 may include forming a thin film over the lamina 102. A thin film may be disposed over a lamina 102 by, for example, spraying, brushing, or rolling a liquid comprising an organic liquid, a polymer, or a polymer precursor material onto the surface of the lamina 102. In some embodiments, a specific pattern may be formed on the lamina 102 using a process similar to conventional silk-screening processes, wherein a template is provided that includes cut-outs or holes formed therein, the template is placed over the lamina 102, and the bond-inhibiting structure 104 is applied to the surfaces of the lamina 102 that are exposed through the template. The template then may be removed from the lamina 102. A thin layer of bond-inhibiting structure 104 remains over the lamina 102 at the locations where the cut-outs or holes in the template were positioned on the lamina 102.

In further embodiments, the bond-inhibiting structure 104 may be applied to selected areas or regions of a lamina 102 by blanket depositing a substantially continuous layer of a bond-inhibiting structure 104 over the lamina 102, and subsequently removing the bond-inhibiting structure 104 from the areas of regions of the lamina 102 at which it is desired to form inter-laminar bonds. By way of example and not limitation, the bond-inhibiting structure 104 may be removed from the lamina using a masking and etching process, in which a protective mask is used to protect selected areas or regions of the bond-inhibiting structure 104 from the etchant during the etching process to prevent the removal of the bond-inhibiting structure 104 from those areas or regions.

In additional embodiments, the bond-inhibiting structure 104 may be applied to selected areas or regions of a lamina 102 by depositing a layer of curable liquid (e.g., a polymer precursor material) over the lamina 102, and subsequently selectively curing the curable liquid only at the areas or regions at which it is desired to form the bond-inhibiting structure 104 on the lamina 102. For example, a laser or other energy beam may be used to cure selected areas or regions of the curable liquid using methods similar to those used in conventional stereolithography processes. A system for stereolithography is sold by 3D Systems, Inc., of Valencia, Calif. As another example, radiation or other energy may be applied to only selected areas or regions of the curable liquid in a photolithographic process by causing the radiation to pass through a mask before it impinges on the curable liquid, the mask preventing the radiation from impinging on certain areas or regions and curing the curable liquid in those areas or regions.

In embodiments where the bond-inhibiting structure 104 comprises one or more structures that are positioned at selected areas or regions between lamina 102 when laying up the multi-laminar structure 106 (FIG. 1B), the bond-inhibiting structures 104 may be removed from the multi-laminar structure 106 prior to further processing the multi-laminar structure 106 to form the CMC structure 108 (FIG. 1C). When the bond-inhibiting structures 104 are removed from the multi-laminar structure 106, the resulting gaps or voids between the lamina 102 at the locations at which the bond-inhibiting structures 104 were previously disposed may inhibit the formation of inter-laminar bonds between the lamina 102 when the multi-laminar structure 106 (FIG. 1C) is further processed (e.g., sintered) to form the CMC structure 108 (FIG. 1C).

As shown in FIG. 1C, in some embodiments, the CMC structure 108 may comprise voids or gaps 110 where the bond-inhibiting structure 104 was previously disposed in forming the multi-laminar structure 106 (FIG. 1B). As referred to herein, gaps 110 include portions of the CMC structure 108 in which there are no interlaminar bonds. FIG. 1C shows gaps 110 as relatively large, visible separations between the lamina 102, however, the gaps 110 may not be visible to the naked eye. In yet other embodiments, the CMC structure 108 may not include any significant voids or gaps 110 between the lamina 102 (and, so, may be structurally comparable to the multi-laminar structure 106 depicted in FIG. 1B), although the amount of inter-laminar bonding in those areas or regions at which the bond-inhibiting structure 104 was previously disposed may be reduced relative to other areas or regions between the lamina 102, thus providing improved flexibility within the structure.

Figure 6A:
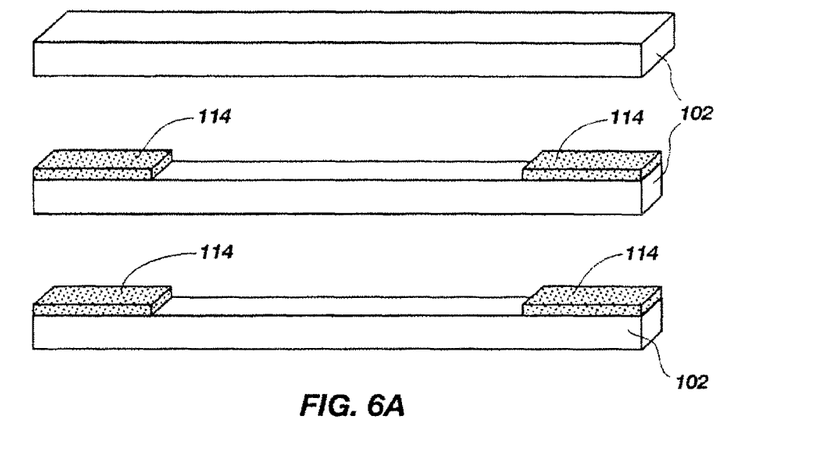
FIG. 6A is an exploded view illustrating components used in the construction of a structure comprising a CMC material according to one embodiment of the invention.
Figure 6B:
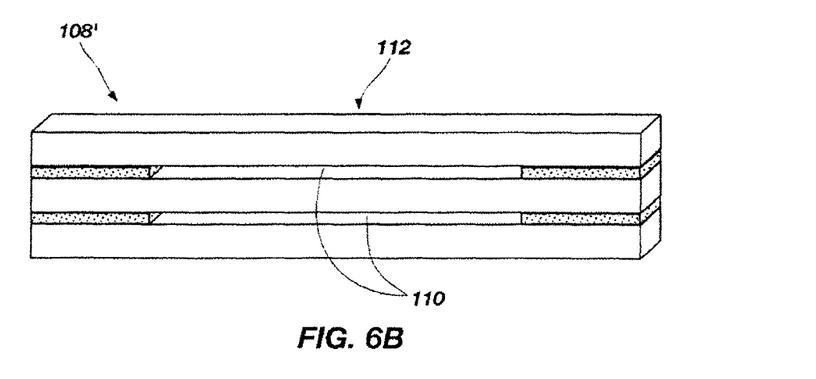
FIG. 6B illustrates the components shown in FIG. 6A in an assembled configuration.

Referring to FIGS. 6A and 6B, the construction of another embodiment of a CMC structure 108' exhibiting enhanced flexibility is illustrated as one non-limiting example. The CMC structure 108' may comprise one or more suitable CMC materials such as, but not limited to, oxide-based CMC materials and non-oxide-based CMC materials.

Referring to FIG. 6A, a plurality of lamina 102 are individually formed and processed to either a green, brown (for a non-oxide CMC), or fully sintered (densified) state, as described above. The plurality of lamina 102 may be joined together at selected locations or regions between the lamina 102 to form CMC structure 108'. If the lamina 102 have not been fully sintered (i.e., the lamina are in either a green or brown state), the CMC structure 108' may be further sintered to a final density.

Instead of joining the lamina 102 together in the manner described above, requiring the use of the bond-inhibiting structure, the lamina 102 may be joined together using a bonding material 114 positioned between adjacent lamina 102. The bonding material 114 may be positioned at select locations or regions where it is desired that the adjacent lamina 102 be joined. By way of example and not limitation, the bonding material 114 may comprise an adhesive or a brazing material.

Any available ceramic adhesive that works effectively with the lamina 102 can be used. For example, high-temperature ceramic-based adhesives such as glass frits, polymeric precursors for ceramic material, Blackglas resin, Aremco-brand adhesives, Cotronics-brand adhesives, Rath-brand adhesives, etc. can be used. The adhesive may also be reinforced through the use of a reinforcing agent, such as ceramic whiskers, particulates, fibers, fabric, and/or non-woven fibrous mat. A non-limiting example of a commercially available adhesive includes RESBOND™ 989 One Component Alumina, available from Cotronics Corp. of Brooklyn, N.Y. A suitable adhesive may be selected according to the specific properties of the CMC structure 108'.

Another non-limiting example of a suitable bonding material includes a brazing material. Any brazing material available that works effectively with the specific materials comprising the lamina 102 can be used. A suitable brazing material may be selected according to the environment in which the CMC structure will operate. Some non-limiting examples of typical brazing materials capable of operating in high to very high temperatures (i.e., having melting points between 3315° F. and 4100° F.) include zirconium, hafnium, $HfB_2$ (with or without HfC), etc. A non-limiting example of a commercially available moderate temperature brazing alloy includes an ABA®, available from Wesgo Metals of Hayward, Calif.

In still other embodiments, the lamina 102 may be joined together using a combination of the two embodiments described above. For example, the lamina 102 may be processed to a green or brown state. The lamina 102 may be bonded together using a bonding material 114 and a bond-inhibiting structure may also be positioned to further guarantee the reduction of bonding between the lamina at the specified locations during further processing, including sintering to a final density.

Conventional CMC structures generally exhibit relatively low strain to failure. In other words, when forces are applied to a conventional CMC structure that cause the CMC structure to bend or otherwise flex, the CMC structures may be damaged, or even fail. By forming a CMC structure having one or more regions comprising at least reduced inter-laminar bonding, according to embodiments of the present invention, the CMC structure may exhibit relatively increased flexibility at those locations. In other words, the CMC structures according to the present invention may be used in applications for which conventional CMC structures were previously not suitable, as they were likely to be damaged and/or fail when bent or otherwise flexed.

At the ends of CMC structure 108, 108' where either no bond-inhibiting structure 104 was positioned, or where a bonding material 114 was positioned, the lamina 102 are joined together. At these locations, the CMC structure 108, 108' will exhibit their full strength and relatively lower flexibility. In the intermediate region 112 of the CMC structure 108, there may be reduced inter-laminar bonding, and the CMC structure may exhibit relatively higher flexibility in this region. CMC structures according to embodiments of the invention may be designed having a limitless number of configurations for various different applications at which CMC structures would be desirable for use (e.g., applications in which the structures will be subjected to high temperatures), but would be required to exhibit increased flexibility relative to conventional CMC structures.

Embodiments of CMC structures of the present invention may be configured in various shapes and for various applications. FIGS. 5A-5E illustrate by way of example and not limitation, various configurations for CMC structures of the present invention. Each of the non-limiting examples may be capable for use in high temperature environments. FIG.

Figure 5A:
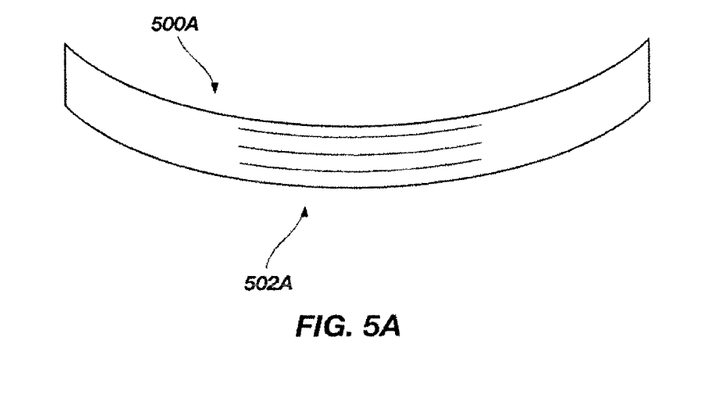
FIG. 5A illustrates a CMC structure configured as a leaf spring.
Figure 5B:
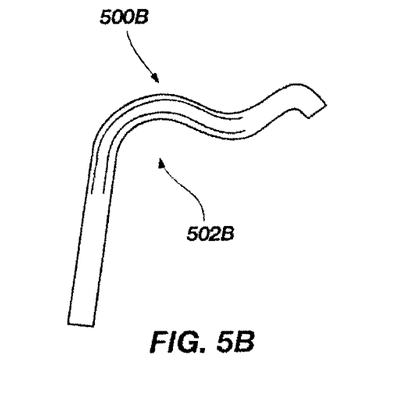
FIG. 5B illustrates a CMC structure configured as a flex spring.
Figure 5C:
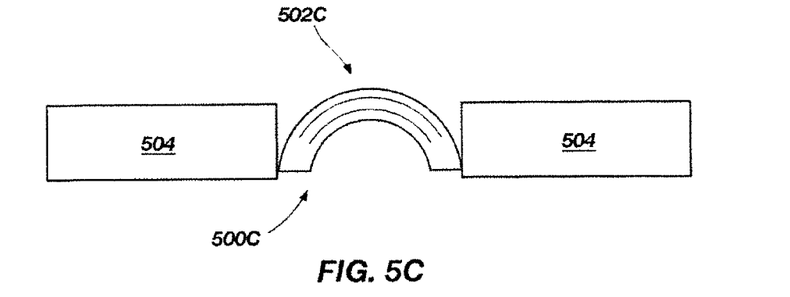
FIG. 5C illustrates a CMC structure configured as a compression seal.
Figure 5D:
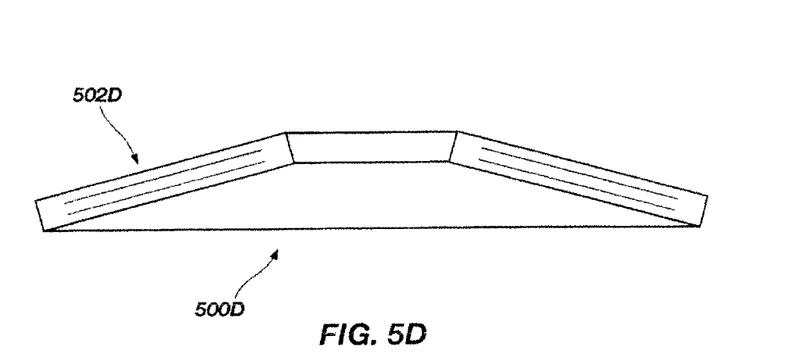
FIG. 5D illustrates a CMC structure configured as a Belleville washer.
Figure 5E:
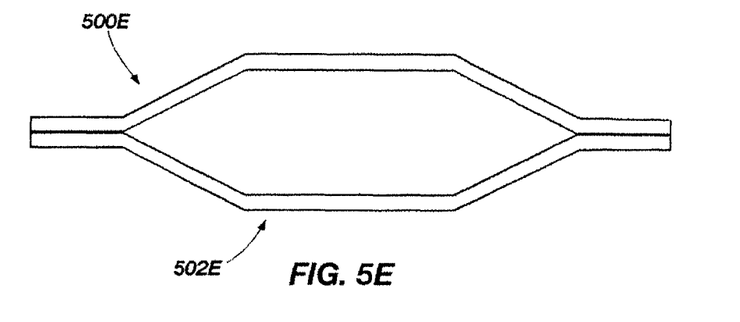
FIG. 5E illustrates a CMC structure configured as a two-sided compression seal.

5A illustrates an embodiment of a CMC structure 500A configured as a leaf spring having a portion 502A exhibiting reduced and/or no interlaminar bonding. FIG. 5B illustrates a CMC structure 500B configured as a flex spring according to one embodiment having a portion 502B exhibiting reduced and/or no interlaminar bonding. FIG. 5C illustrates a CMC structure 500C according to an embodiment of the present invention configured as a compression seal. The compression seal CMC structure 500C is illustrated as sealing a portion 502C between two members 504. FIG. 5D is a cross-section view of a CMC structure 500D configured as a Belleville washer having portion 502D exhibiting reduced and/or no interlaminar bonding. FIG. 5E illustrates a CMC structure 500E configured as a two-sided compression seal according to one embodiment having a separated portion 502E formed between the two lamina. The compression seal CMC structure 500E may be placed between two adjacent members (not shown) to form a seal therebetween. The structure 500E may be preloaded by placing the structure 500E in a gap that is smaller than the natural thickness (or height as illustrated in FIG. 5E) of the seal and causes the top and bottom lamina in the separated portion 502E to be compressed so that the separated portion 502E is at least partially closed.

Figure 2:
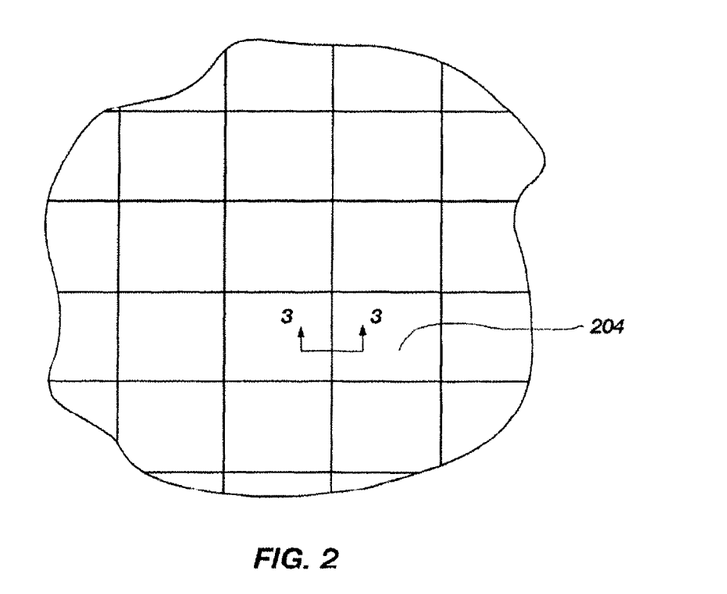
FIG. 2 schematically illustrates a portion of a thermal protection system (TPS) comprising a plurality of insulative tiles as carried on a re-entry vehicle.

As one particular non-limiting example of a particular embodiment of a CMC structure of the present invention comprises a relatively flexible seal for a thermal protection system (TPS). FIG. 2 illustrates a portion of a TPS on a re-entry vehicle that includes a plurality of insulative tiles or panels 204. A non-limiting example of such a TPS is disclosed in U.S. Pat. No. 6,827,312, to Riedell, the disclosure of which is incorporated herein in its entirety by this reference.

Figure 3A:
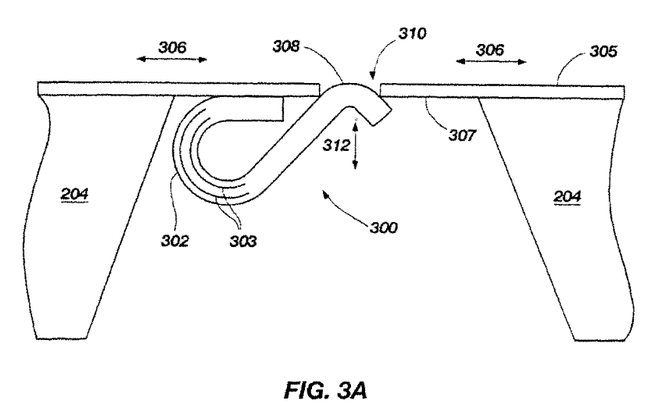
FIG. 3A is a section view taken along line 3-3 of FIG. 2 illustrating an embodiment of a CMC structure configured as a flexible seal for the TPS and bridging a gap between two adjacent tiles.

FIG. 3A is a section view taken along line 3-3 of FIG. 2 and illustrates an embodiment of a CMC structure configured as a flexible seal 300 for the TPS. The flexible seal 300 may be constructed in a manner similar to that described above with relation to FIGS. 1A-1C. For example, a plurality of lamina 102 (FIGS. 1A and 1B) may be laid-up on or in tooling to create the required shape of the flexible seal 300. A bond-inhibiting structure 104 (FIGS. 1A and 1B) may be disposed at selected areas or regions between the lamina 102 to increase the flexibility of those regions in the flexible seal 300. For example, the bond-inhibiting structure 104 may be disposed between the lamina 102 at one or more locations 303 (or have been disposed and then subsequently removed) within at least a portion of the curved section 302 of the flexible seal 300. In this manner, the curved section 302 of the flexible seal 300 may be more flexible relative to other sections or regions of the flexible seal 300. Additional lamina with subsequent bond-inhibiting structure 104 can be used to tailor the flexibility or stiffness of a given application.

Figure 3B:
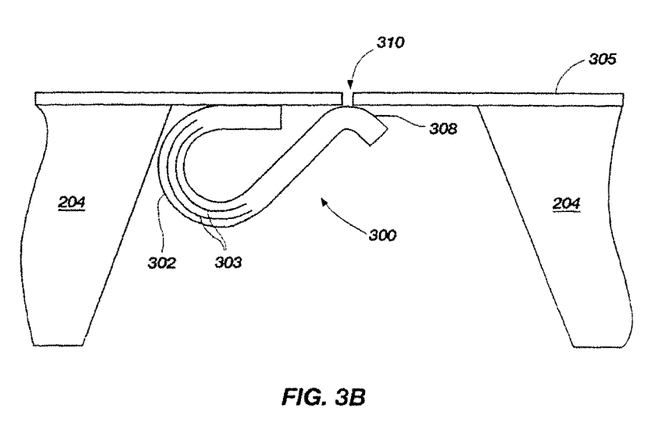
FIG. 3B illustrates the TPS tiles and CMC structure of FIG. 3A with the tiles in an expanded state due to an increase in temperature.

In the embodiment illustrated in FIG. 3A, each of the plurality of TPS panels 204 may include a face skin 305 having an underside 307. Flexible seals 300 may be attached to the underside of the face skin 307 of the TPS panels 204 such that gap-filling portions 308 of the flexible seals 300 fill or cover spaces or gaps 310 provided between adjacent TPS panels 204 to accommodate thermal expansion of the TPS panels 204. The flexible seal 300 may be positioned in gap 310 in a partially flexed state such that it maintains sealing pressure against the adjacent TPS panels 204 while still being able to undergo increased flex. As the TPS is heated and cooled, the TPS panels 204 laterally expand and contract due to thermal expansion in the direction indicated by arrows 306. As the TPS panels 204 expand and contract due to thermal expansion, the gap-filling portion 308 of the flexible seal 300 filling the space or gap 310 between the TPS panels 204 may be moved vertically, as indicated by arrows 312, due to increased or reduced contact with TPS panels 204 in spaces or gaps 310. For example, FIG. 3B illustrates the TPS panels 204 in an expanded state due to an increase in temperature. As the TPS panels 204 expand, the space 310 becomes smaller and the gap-filling portion 308 of the flexible seal 300 is forced downward by contact with TPS panels 204. The flexible seal 300 may flex at the curved section 302 as the gap-filling portion 308 of the flexible seal is forced down to accommodate for the thermal expansion of the TPS panels 204 without undergoing significant damage or failure due to relieving interlaminar tension stresses that would be developed during bending of the seal. Similarly, when TPS panels 204 cool and contract, gap-filling portion 308 of flexible seal 300 is moved upwardly into enlarged gap or space 310.

Figure 4:
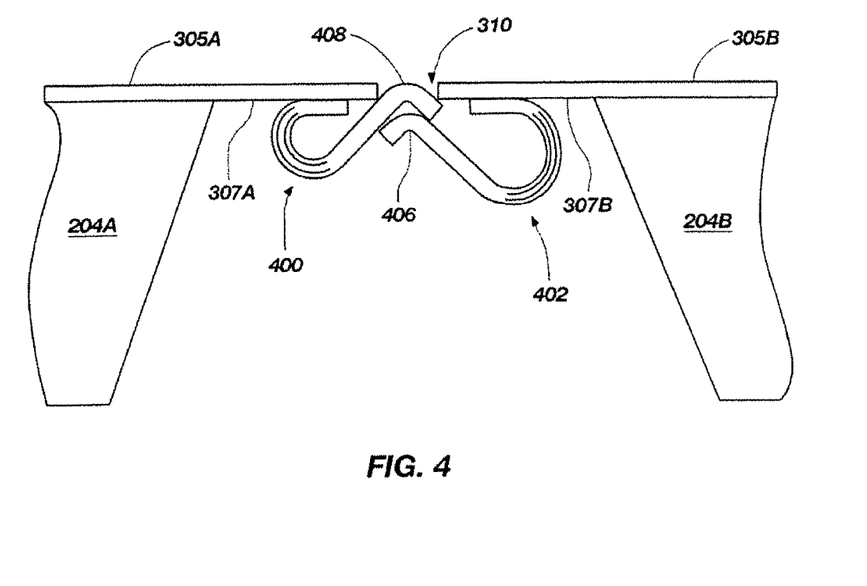
FIG. 4 illustrates an embodiment of a TPS employing two partially overlapping CMC structures of the present invention configured as flexible seals and disposed between adjacent tiles.

In some embodiments of TPS systems according to the present invention, as described above, the use of two, superimposed flexible seals may be desirable to provide additional force against the TPS panels 204 in the spaces 310 between the TPS panels 204, to create a relatively tighter and more robust seal. FIG. 4 illustrates an embodiment of a TPS employing two CMC structures of the present invention configured as flexible seals 400 and 402, which may be cooperatively configured as shown. Flexible seals 400, 402 may be constructed similar to flexible seal 300 (FIG. 3) described above. First flexible seal 400 may be attached to the underside 307A of the first face skin 305A of the first TPS panel 204A in a similar manner as flexible seal 300 (FIG. 3). A gap-filling portion 408 of first flexible seal 400 may fill the space 310 between the first and second TPS panels 204A, 204B. A second flexible seal 402 may be positioned on the adjacent, second TPS panel 204B. The second flexible seal 402 may be attached to the second face skin 305B on the underside 307B having a gap-filling portion 406 positioned adjacent the underside of portion 408. The relative more resilient or flexible, first and second flexible seals 400 and 402 cooperatively provide enhanced spring force and the two gap-filling portions 406 and 408 provide a redundant seal capability.

As mentioned above, embodiments of CMC structures of the present invention may be used in a wide variety of applications other than in TPS systems. By way of example and not limitation, embodiments of the present invention may be employed as seals, leaf springs, flex springs, compression seals, and Belleville washers in several applications, including, but not limited to, hot structures, control surfaces, engine ducts or other applications that move relative to one another due to differences in material types, thermal expansion or temperature differences. Additionally, although the embodiments in FIGS. 1A-1C and 6A-6B illustrate three layers of lamina, one of ordinary skill in the art will recognize that the present invention includes embodiments comprising any number of a plurality of lamina configured as described above. By way of example and not limitation, embodiments of the present invention may comprise two lamina, while other embodiments may include more than two lamina.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and equivalents, of the claims which follow.

What is claimed is:

1. A method of forming a ceramic matrix composite structure, the method comprising:
providing a plurality of lamina, the lamina of the plurality comprising a reinforcing phase in a matrix phase comprising a ceramic material, each of the lamina having a substantially consistent thickness along its length and defined by the reinforcing phase and the matrix phase;
positioning the lamina of the plurality adjacent to one another to form a multi-laminar structure; and
selectively bonding adjacent lamina, of the multi-laminar structure, to one another proximate to opposing ends of the multi-laminar structure to form a ceramic matrix composite structure exhibiting, in a region disposed between the opposing ends of the multi-laminar structure, increased flexibility relative to a rigidity exhibited proximate the opposing ends, the region disposed between the opposing ends and comprising less interlaminar bonding of the adjacent lamina than interlaminar bonding of the adjacent lamina proximate the opposing ends,
the adjacent lamina comprising, both before and after the positioning and selective bonding of the adjacent lamina and after completion of the forming of the ceramic matrix composite structure, along the region disposed between the opposing ends, the reinforcing phase in the matrix phase with a lamina composition along the region disposed between the opposing ends being the same as the lamina composition at the opposing ends,
the reinforcing phase and the matrix phase defining, prior to the positioning and prior to the selective bonding of the adjacent lamina, the substantially consistent thickness of each of the adjacent lamina along the length of each and defining, after the selective bonding of the adjacent lamina and after completion of the forming of the ceramic matrix composite structure, the substantially consistent thickness of each of the adjacent lamina between the opposing ends.

2. The method of claim 1, wherein positioning the lamina of the plurality adjacent to one another to form a multi-laminar structure comprises:
stacking the lamina of the plurality; and
disposing segments of a bond-inhibiting material interleaved with the lamina of the plurality.

3. The method of claim 1, wherein positioning the lamina of the plurality adjacent to one another to form a multi-laminar structure comprises:
stacking the lamina of the plurality; and
interleaving a bonding material, disposed proximate the opposing ends, with the lamina of the plurality.

4. The method of claim 3, wherein interleaving a bonding material comprises interleaving a high-temperature ceramic-based adhesive reinforced with a reinforcing agent.

5. The method of claim 1, wherein positioning the lamina of the plurality adjacent to one another to form a multi-laminar structure comprises:
stacking the lamina of the plurality;
interleaving the lamina of the plurality with a bonding material proximate to the opposing ends of the lamina; and
interleaving the lamina of the plurality with a bond-inhibiting material proximate to the region disposed between the opposing ends.

6. The method of claim 1, further comprising shaping the multi-laminar structure to curve through the region disposed between the opposing ends.

7. A method of forming a ceramic matrix composite structure, the method comprising:
providing a plurality of lamina, the lamina of the plurality comprising reinforcing fibers in a matrix phase comprising a ceramic material, each of the lamina having a substantially consistent thickness along its length and defined by the reinforcing fibers and the matrix phase;
positioning the lamina of the plurality adjacent one another; and
bonding a lamina of the plurality to a pair of other lamina of the plurality along one end of the lamina and of the pair of other lamina and along an opposing end of the lamina and of the pair of other lamina without bonding the lamina to the pair of other lamina in a region between the one end and the opposing end to form a ceramic matrix composite structure exhibiting greater flexibility proximate the region than proximate the one end and the opposing end,
both before and after the positioning and the bonding and after completing the forming of the ceramic matrix composite structure, the lamina and the pair of other lamina each comprising:
in the region between the one end and the opposing end, the reinforcing fibers in the matrix phase; and
a lamina composition along the region between the one end and the opposing end that is the same as the lamina composition at the one end and at the opposing end,
the reinforcing fibers and the matrix phase defining, prior to the positioning and prior to the bonding, the substantially consistent thickness of each of the lamina and defining, after the bonding and after completing the forming of the ceramic matrix composite structure, the substantially consistent thickness of each of the lamina and the pair of other lamina along and between the one end and the opposing end.

8. The method of claim 7, wherein bonding a lamina of the plurality to a pair of other lamina of the plurality comprises forming chemical bonds between the lamina and the pair of other lamina.

9. The method of claim 7, wherein providing a plurality of lamina comprises providing a plurality of lamina comprising reinforcing fibers selected from the group consisting of carbon fibers, polyimide fibers, Silicon carbide (SiC) fibers, Siliconoxycarbide (SiOC) fibers, alumina, mullite-based fibers, and sapphire-based fibers.

10. The method of claim 7, wherein providing a plurality of lamina comprises impregnating a fabric of the reinforcing fibers with a ceramic matrix slurry or a pre-ceramic polymer.

11. The method of claim 7, wherein bonding a lamina of the plurality to a pair of other lamina of the plurality along one end of the lamina and of the pair of other lamina and along an opposing end of the lamina and of the pair of other lamina without bonding the lamina to the pair of other lamina in a region between the one end and the opposing end comprises:
disposing a template over the lamina, the template defining an opening exposing the region between the one end and the opposing end;
applying a bond-inhibiting material through the opening in the template to dispose the bond-inhibiting material along the region between the one end and the opposing end; and disposing an upper lamina of the pair of other lamina over the lamina and the bond-inhibiting material.

12. The method of claim 7, wherein bonding a lamina of the plurality to a pair of other lamina of the plurality along one end of the lamina and of the pair of other lamina and along an opposing end of the lamina and of the pair of other lamina without bonding the lamina to the pair of other lamina in a region between the one end and the opposing end comprises:

depositing a layer of bond-inhibiting structure over the lamina;

removing segments of the bond-inhibiting structures to expose the one end of the lamina and the opposing end of the lamina and to leave a remnant segment of the bond-inhibiting structure in the region between the one end and the opposing end; and disposing an upper lamina of the pair of other lamina over the lamina and the remnant segment of the bond-inhibiting structure.

13. A method of forming a ceramic matrix composite structure, the method comprising:

providing a plurality of lamina, the lamina of the plurality comprising reinforcing fibers in a matrix phase comprising a ceramic material, the reinforcing fibers and the matrix phase defining, for each of the lamina, a substantially consistent thickness along its length;

interleaving lamina of the plurality with segments of a bond-inhibiting material to form a multi-laminar structure comprising a segment of the bond-inhibiting material directly between two adjacent lamina of the plurality, each lamina of the two adjacent lamina comprising the reinforcing fibers in the matrix phase extending along the segment of the bond-inhibiting material, each lamina of the two adjacent lamina defining the substantially consistent thickness including along the segment of the bond-inhibiting material;

sintering the multi-laminar structure to selectively bond the two adjacent lamina, of the multi-laminar structure, to one another about the segments of the bond-inhibiting material; and removing the segments of the bond-inhibiting material to form a ceramic matrix composite structure exhibiting, proximate to a region from which the segments of the bond-inhibiting material was removed, increased flexibility relative to a region about that from which the segments of the bond-inhibiting material was removed, the reinforcing fibers and the matrix phase defining, prior to the interleaving and the sintering and after completing the forming of the ceramic matrix composite structure, the substantially consistent thickness, and each of the two adjacent lamina having, prior to the interleaving and the sintering and after completing the forming of the ceramic matrix composite structure, lamina composition along the region from which the segments of the bond-inhibiting material will be, or have been, removed the same as the lamina composition at selective bonded regions of the two adjacent lamina.

14. The method of claim 13, wherein interleaving lamina of the plurality with segments of a bond-inhibiting material comprises interleaving the lamina of the plurality with planar segments of the bond-inhibiting material.

15. The method of claim 14, wherein interleaving the lamina of the plurality with planar segments of the bond-inhibiting material comprises interleaving the lamina of the plurality with planar segments comprising substantially planar surfaces opposing neighboring lamina of the plurality.

16. The method of claim 13, wherein interleaving lamina of the plurality with segments of a bond-inhibiting material comprises interleaving lamina of the plurality with segments of a bond-inhibiting material substantially free of iron, phosphate, fluorides, and calcium.

17. The method of claim 13, wherein interleaving lamina of the plurality with segments of a bond-inhibiting material comprises interleaving lamina of the plurality with segments of an organic polymer material.

18. The method of claim 13, wherein interleaving lamina of the plurality with segments of a bond-inhibiting material comprises interleaving lamina of the plurality with metal inserts.

19. The method of claim 13, wherein removing the segments of the bond-inhibiting material to form a ceramic matrix composite structure comprises removing the segments of the bond-inhibiting material to define gaps in the ceramic matrix composite structure at the region from which the segments of bond-inhibiting material was removed.

* * * * *

UNITED STATES PATENT AND TRADEMARK OFFICE
CERTIFICATE OF CORRECTION

PATENT NO. : 10,967,621 B2
APPLICATION NO. : 14/644062
DATED : April 6, 2021
INVENTOR(S) : James A. Riedell It is certified that error appears in the above-identified patent and that said Letters Patent is hereby corrected as shown below:

In the Claims
Claim 13, Column 16, Line 10, change "lamina" to --a lamina--

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*